United States Patent [19]

Tsukamoto et al.

[11] Patent Number: 5,735,369
[45] Date of Patent: Apr. 7, 1998

[54] BAND BRAKE DRUM SUPPORTING DEVICE FOR AUTOMATIC TRANSMISSION

[75] Inventors: Kazumasa Tsukamoto; Masahiro Hayabuchi; Masaaki Nishida; Akitoshi Kato; Satoru Kasuya; Nobutada Sugiura, all of Anjo; Tatsuya Iida, Takefu, all of Japan

[73] Assignee: Aisin Aw Co., Ltd., Anjo, Japan

[21] Appl. No.: 771,142

[22] Filed: Dec. 20, 1996

[30] Foreign Application Priority Data

May 21, 1996 [JP] Japan ................. 8-148522

[51] Int. Cl.$^6$ .......................................... F16D 51/00
[52] U.S. Cl. ................. 188/77 R; 188/77 W; 192/17 R
[58] Field of Search ...................... 188/77 R, 77 W, 188/82.8; 475/204, 206, 281, 282; 192/17 R, 17 A

[56] References Cited

U.S. PATENT DOCUMENTS

| | | | |
|---|---|---|---|
| 5,328,008 | 7/1994 | Sano | 188/77 R X |
| 5,470,284 | 11/1995 | Taniguchi et al. | 475/281 X |
| 5,511,639 | 4/1996 | Sherman | 188/77 R |
| 5,582,274 | 12/1996 | Umezawa | 188/77 W |

FOREIGN PATENT DOCUMENTS 2-129442  5/1990  Japan .

*Primary Examiner*—Robert J. Oberleitner
*Assistant Examiner*—Pamela J. Lipka
*Attorney, Agent, or Firm*—Oliff & Berridge, P.L.C.

[57] ABSTRACT

A band brake drum supporting device for an automatic transmission having a band drum to be retained in a case by fastening a band brake which is joined to a rotary element of the automatic transmission and arranged in the case. The drum includes a band engaging portion and a cylindrical drum supporting portion extending radially inward from the band engaging portion while being offset axially with respect to the band engaging portion. The outer circumference of the drum supporting portion is supported through two axially juxtaposed bearings on a stationary support portion which extends radially outward of the drum supporting portion from the case. The stationary support portion includes a cylindrical boss portion disposed coaxially with the drum supporting portion and engaging at its inner circumference with the two bearings and a planar flange portion extending radially outward from the end portion of the boss portion which is located closer to the band brake.

4 Claims, 2 Drawing Sheets

|   | C-1 | C-2 | B-1 | B-2 | B-3 | B-R |
|---|---|---|---|---|---|---|
| P |   |   |   |   |   |   |
| REV | O |   |   |   |   | O |
| N |   |   |   |   |   |   |
| 1ST | O |   |   |   | O |   |
| 2ND |   | O |   |   | O |   |
| 3RD | O | O |   |   |   |   |
| 4TH |   | O | O |   |   |   |
| 5TH |   | O |   | O |   |   |

BAND BRAKE DRUM SUPPORTING DEVICE FOR AUTOMATIC TRANSMISSION

BACKGROUND OF THE INVENTION

1. Field of the Invention

The invention relates to a band brake for an automatic transmission and, more particularly, to a support device for the band drum of the brake.

2. Description of the Related Art

In the automatic transmission, there is arranged a band brake as a frictional element for retaining a rotary element of the automatic transmission in a case. The drum of the band brake is generally supported at its radially inner support portion within the axial width of the drum by the case through a bearing so that the bearing portion may be freed from the moment force on the supporting portion, as generated by the radial force acting upon the drum at a band fastening time. A band brake drum supporting device thus structured is disclosed in Japanese Patent Laid-Open No. 129442/1990. By adopting this structure, moreover, it is possible to simplify the drum supporting structure.

When the drum of the band brake can be supported at its radially inner portion within its axial width as in the related art, it can adopt the aforementioned structure but it may not be possible to construct the drum supporting portion by extending the case toward the inner circumference of the drum due to the restrictions upon the arrangement of the related mechanism. In this case, it is necessary to offset the supporting portion from the band engaging portion of the drum, that is, to make an axially displaced arrangement. This offset applies a high moment of force to the bearing portion so that the bearing supporting portion has to have a rigid structure thereby enlarging the size of the transmission.

SUMMARY OF THE INVENTION

It is, therefore, a first object of the invention to provide a band brake drum supporting device for an automatic transmission, which can avoid the enlargement of the device as much as possible when the drum supporting portion of the device has to be offset.

A second object of the invention is to reduce the size of the supporting portion in the device located at the case side.

A third object of the invention is to make it possible to use the supporting portion in the device, located at the case side, for supporting another rotary element of the transmission.

In order to achieve the first object, according to the invention, there is provided a band brake drum supporting device for an automatic transmission, comprising a band drum to be retained in a case by fastening a band brake which is joined to a rotary element of the automatic transmission and arranged in the case, wherein the drum includes a band engaging portion; and a cylindrical drum supporting portion extending radially inward from the band engaging portion while being offset axially with respect to the band engaging portion, the outer circumference of the drum supporting portion supported through two axially juxtaposed bearings on a stationary support portion which extends radially outward of the drum supporting portion from the case, and the stationary support portion includes a cylindrical boss portion disposed coaxially with the drum supporting portion and engaging at its inner circumference with the two bearings; and a planar flange portion extending radially outward from the end portion of the boss portion and located closer to the band brake.

In order to achieve the second object, the case is made of an aluminum alloy, and the stationary support portion is made of steel separately of the case and then attached to the case.

In order to achieve the third object, moreover, the stationary support portion supports an output gear through a bearing at the outer circumferential side of a boss portion.

In the structure for achieving the first object, the moment force is dispersed by supporting the drum through the two axially juxtaposed bearings. In this case, the higher moment force acts upon the bearing which is located closer to the band brake. Thus, the structure is made such that the flange portion is extended from the side of the boss portion supporting the bearing, as located at the side for supporting the bearing subjected to the higher moment force, to enhance the rigidity of the boss portion, located close to the band brake, to endure the high moment force while adopting a cantilever structure. With this structure, therefore, sufficient drum supportability can be obtained even if the supporting portion is offset, and a spacing, as opened at one side, can be formed around the outer circumference of the boss portion and a rotational member arrangement minimizing the enlargement in size of the device is possible by arranging another member of the transmission in the space created.

According to the structure for achieving the second object, moreover, the stationary support portion is made of steel, having a high rigidity, so that it can be made more compact than a structure, in which the support portion is made of an aluminum alloy, as is the case, while retaining a similar rigidity.

According to the structure for achieving the third object, the moment force of the drum can be shielded by the stationary support portion to exert no action upon the output gear. It is also possible to prevent the generation of noise and the influences upon durability that might otherwise be caused by the failure in the meshing engagement of the output gear.

BRIEF DESCRIPTION OF THE DRAWINGS

The invention will be described with reference to the drawings, in which.

DESCRIPTION OF THE PREFERRED EMBODIMENT

Figure 1:
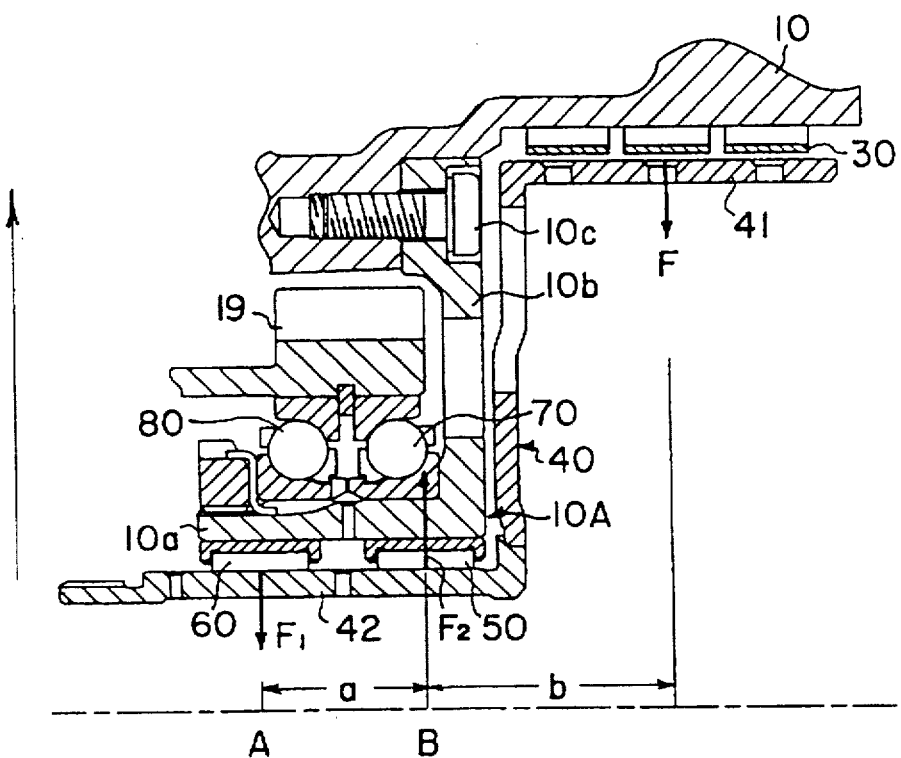
FIG. 1 is a section of a band brake drum supporting device for an automatic transmission according to an embodiment of the invention.

An embodiment of the invention will be described with reference to the accompanying drawings. As shown in FIG. 1, a band brake 30 is applied to a drum 40 which is joined by a spline, or similar joining method, to a suitable rotational element (not shown) of an automatic transmission. The drum 40 is retained to a case 10 by fastening the band brake 30 within the case 10. The band brake 30 deposed to be wrapped around the band engaging portion 41. One end of the band brake 30 is held by an anchor while the other end is connected to a servo in a conventional manner (not shown). The servo tightens the band brake 30 to brake the band engaging portion 41 of the drum 40 stopping the drum 40's rotation.

The drum 40 comprises a band engaging portion 41 and a cylindrical drum supporting portion 42 offset axially with respect to the band engaging portion 41 and positioned radially (the radial direction indicated by the arrow) internally of the band engaging portion 41. The drum supporting portion 42 is supported at its outer circumference through two axially juxtaposed bearings 50, 60 by a stationary support portion 10A which extends from the case 10 radially outward with respect to the drum supporting portion 42. The band engaging portion 41 and the drum supporting portion 42 are made separate in the shown embodiment but may be united.

The stationary support portion 10A for rotatably supporting the drum supporting portion 42 comprises a cylindrical boss portion 10a which is arranged coaxially with the drum supporting portion 42 and which is engaged with the races of the two bearings 50, 60 in the inner circumference of the cylindrical boss portion 10a by press-fitting; and a planar flange portion 10b which extends radially outward from the end portion of the boss portion 10a and is located closer to the band brake 30. In this embodiment, the case 10 is made of an aluminum alloy like the case of the ordinary automatic transmission, whereas the stationary support portion 10A is made of steel separately of the case 10 and immovably mounted in the case 10 by suitable fixing members, such as bolts 10c. The stationary support portion 10A supports an output gear 19 at the outer circumferential side of its boss portion 10a through a pair of ball bearings 70, 80.

In the support device thus structured, here will be determined the moment forces on the individual fulcrums (i.e., the cylindrical support face, strictly speaking, but the points for calculation convenience) of the drum 40 by the forces to be applied to the individual fulcrums at the time of applying the brake. Let it be assumed that the force applied to the band engaging portion 41 by the brake applying force be F, that the force applied to the fulcrum A of one bearing 60 be $F_1$, that the force applied to the fulcrum B of the other bearing 50 be $F_2$, that the axial distance between the points A and B be a, and that the axial distance from the point B to the center point of action of the brake applying force be b. Then, the following equation is satisfied by the balance of the moment force at the point B:

$$F_1 \cdot a = F \cdot b$$

$$\therefore F_1 = (b/a) \cdot F \qquad (1).$$

Next, from the balance of the moment force at the point A:

$$F_2 \cdot a = F \cdot (a+b)$$

$$\therefore F_2 = \{(a+b)/a\} \cdot F \qquad (2).$$

It is found from the relationship of equations (1) and (2) that the following relationships hold:

$$F < F_1 < F_2.$$

Specifically, when the moment force is dispersed by supporting the drum 40 at the two points by the two axially juxtaposed bearings 50, 60, the higher moment force is applied to the bearing 50 which is closer to the band brake 30. According to the invention, therefore, the boss portion 10a is given a structure to withstand a high moment force by extending the flange portion 10b from the side at which the bearing 50, to be subjected to the higher moment force, is supported and enhancing the rigidity of the boss portion 10a by making use of the flange portion 10b. As a result, a sufficient supporting ability can be retained even if the support portion of the drum 40 is offset.

In this embodiment, moreover, the stationary support portion 10A is made of steel, having a high rigidity, so that the stationary support portion 10A can be made thinner in its entirety and more compact yet have an identical rigidity than if the structure were made of the same aluminum alloy as the case 10.

Thanks to this structure, the space can be formed around the outer circumference of the boss portion 10a to arrange another member of the transmission, i.e., the output gear 19 in the present embodiment. With this structure, moreover, it is possible to suppress an increase in the size of the device. Therefore, an example of the transmission mechanism adopting such a structure will now be described.

Figures 2, 3:
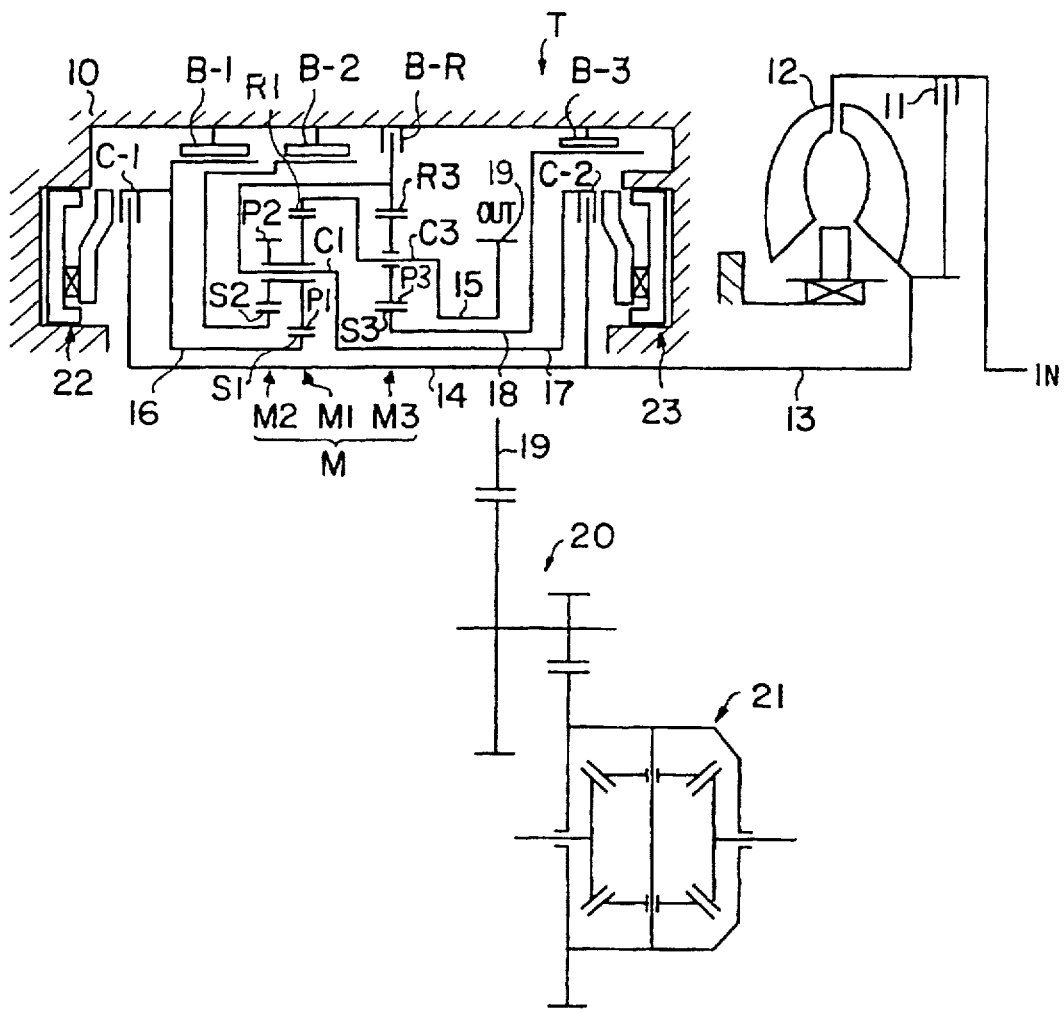
FIG. 2 is a schematic diagram of the structure of an automatic transmission to which the band brake drum supporting device is applied.
FIG. 3 is an operation table of the aforementioned automatic transmission.

FIG. 2 shows the overall structure of a gear train of the aforementioned automatic transmission T. This transmission T comprises a torque converter 12 equipped with a lockup clutch 11; a transmission mechanism M composed of three stages of planetary gear sets M1, M2, M3; and brakes B-1, B-2, B-R, B-3 and clutches C-1 and C-2, as arranged in association with the foregoing components. The pinion gears P1, P2 of the two gear sets M1, M2 respectively are united, and the ring gears R1, R3 and the carriers C3, C1 of the two gear sets M1, M3 are respectively connected to each other. The sun gear S1 and the carrier C1 of the gear set M1 are connected through the clutches C-1, C-2, respectively, to an input shaft 14 leading to a turbine shaft 13 of the torque converter 12 so that they may be input elements. The ring gear R1 and the carrier C3, as connected to each other, are connected through an output shaft 15 to the output gear 19 which acts as an output element.

Moreover, the sun gear S1 of the gear set M1 can be fixed in the transmission case 10 by the brake B-1. The sun gear S2 of the gear set M2 can be fixed in the transmission case 10 by the brake B-2. The sun gear S3 of the gear set M3 can also be fixed in the transmission case 10 by the brake B-3. The ring gear R3, as connected to the carrier C1, can be fixed in the transmission case 10 by the brake B-R. In the embodiment, more specifically, the sun gear S1 is connected to the clutch C-1 through a sun gear shaft 16 which is fitted on the outer circumference of the input shaft 14. The carrier C1 is connected to the clutch C-2 through a carrier shaft 17 which is fitted on the outer circumference of the input shaft 14. The sun gear S3 is connected to the brake B-3 through a sun gear shaft 18 which is fitted on the outer circumference of the carrier shaft 17. The individual brakes, excepting the brake B-R, have the band brake structure, and the brake B-R has a multi-disc brake structure. In this embodiment, the output gear 19 is connected through a counter gear 20 to a differential unit 21 to thereby provide a transmission of transverse structure.

The automatic transmission T thus structured, supplies oil pressure to the hydraulic servos corresponding to each clutch and each brake, and achieves each speed range by meshing (shown by a o mark in FIG. 3) and release (shown with no mark) of each clutch and each brake as shown FIG. 3, under the control by the electronic control apparatus and the hydraulic control apparatus. That is, the first speed range ($1^{ST}$) is achieved by the meshing of the clutch C-1 and the brake B-3. At this time the rotation of the input shaft 14 enters the sun gear S1 through the clutch C-1, and is output to output gear 19 as a rotation of the carrier C3 which is decelerated the most by stopping by the meshing of the sun gear S3 being meshed with the brake B-3.

On the other hand, the second speed range ($2^{ND}$) is achieved by the meshing of the clutch C-2 and the brake B-3. At this time the input entering the carrier 17 through the clutch C-2 enters without change the ring gear R3 through the carrier C1, and is output to output gear 19 as a differential rotation of the carrier C3 with the sun gear S3 as a reaction element which is stopped by being meshed with the brake B-3. The third speed range ($3^{RD}$) is achieved by direct connection of the first planetary gear M1 by the meshing of both clutches C-1, C-2. At this time the rotation of the input shaft 14 is output to output gear 19 as a rotation of carrier C3 without change.

The fourth speed range ($4^{TH}$) and above of the automatic transmission is designated over-drive and the fourth speed range ($4^{TH}$) is accomplished by meshing of the clutch C-2 and the meshing of brake B-1 which stops sun gear S1 by meshing. At this time, the rotation of the input shaft 14 is transferred from the carrier C3 to the output gear 19 as the rotation of the ring gear R1 which is increased by the rotation of the carrier C1 via rotation of the pinion gear P1. On the other hand, the fifth speed range ($5^{th}$) is achieved by meshing of the clutch C-2 and the meshing of the brake B-2. At this time, the rotation of the input shaft 14 is transferred from the carrier C3 to the output gear 19 as the rotation of the ring gear R1, which is further increased than during achievement of the fourth speed range by the rotation of carrier C1 via the pinion gear P2, with a small diameter and which opposes the sun gear S2.

Moreover, the backward speed range (REV) is achieved by the meshing of the clutch C-1 and the brake B-R. At this time, the rotation of the carrier C1 is stopped by anchoring of the ring gear R3 to the case 10 by meshing of the brake B-R against the input to the sun gear S1 through the clutch C-1, and the rotation of the ring gear R1 which is decelerated by the reverse rotation caused by the rotation of the pinion gear P1 is output from the output gear 19 through the carrier C3.

In the automatic transmission T, the invention is applied to the band brake B-3 by exemplifying the rotary element by the sun gear shaft 18. Especially in this automatic transmission T, moreover, the hydraulic servos 22, 23 of the two input clutches C-1, C-2, respectively, are housed in the lefthand and righthand end walls of the transmission case 10 so that the clutches C-1, C-2 are operated by the push members for transmitting the pushing forces of their pistons through the bearings. In this structure, the drum (the details of which were discussed with respect to FIG. 1) 40 of the band brake B-3, as arranged around the outer circumference of the frictional elements of the clutch C-2, cannot be so supported by the case 10 as to shield the frictional elements of the clutch C-2 and the hydraulic servo 23. Moreover, the frictional elements of the clutch C-2 are arranged radially internally of the drum 40 of the band brake B-3 so that the drum supporting portion 42 cannot be disposed unlike the brake B-1 radially internally of the drum. In this mode, therefore, it is impossible to avoid the arrangement in which the drum supporting portion 42 is offset from the band brake B-3. Therefore, the structure of the invention can be effectively applied to this transmission.

In the transmission T, moreover, there is structure in which the clutches C-1, C-2 are arranged at the two ends of the transmission mechanism so that the individual gear stages are achieved by connecting the clutches at the two ends to the input shaft 14. Generally speaking, therefore, the output gear 19 is supported by either the input shaft or another intermediate shaft (e.g., the sun gear shaft 18 in the present example) arranged coaxially with the input shaft 14. In this example, the output gear 19 is not supported by another gear (i.e., the sun gear shaft 18) but is supported directly by the case 10 (i.e., the stationary support portion 10A mounted on the case). The advantage of this structure resides in that the moment force of the drum 40 can be so blocked by the stationary support portion 10A that it may not act upon the output gear 19. Thus, the inclination of the output gear 19, as might otherwise be caused by the warp of the sun gear shaft 18, can be prevented preventing generation of noise, as might otherwise be effected by the failure in the meshing engagement with the counter gear 20, thereby improving durability.

Although the invention has been described in detail in connection with one embodiment, it can be embodied in various ways by modifying its specific embodiment within the scope of the individual items of the claims.

What is claimed is:

1. A band brake drum supporting device for an automatic transmission, comprising:

a band drum rotatably mounted in a case and engaged by a band brake, said band drum joined to a rotary element of the automatic transmission arranged in the case, wherein said band drum comprises:
a cylindrical band engaging portion;
a cylindrical drum supporting portion radially inward of the band engaging portion and offset axially from the band engaging portion such that a free end of each of said band engaging portion and said cylindrical drum supporting portion open in axially opposite directions; and
an annular portion connecting said cylindrical band engaging portion and said cylindrical drum supporting portion, wherein the outer circumference of the drum supporting portion is supported by two axially separated bearings on a stationary support portion which extends radially inward from the case, and the stationary support portion includes:
a cylindrical boss portion disposed coaxially opposed with the cylindrical drum supporting portion and engaging a radially outer circumference of the cylindrical drum supporting portion with the two bearings; and
a planar flange portion extending radially inward from the case to an end portion of the boss portion which is axially closer to the band brake.

2. The band brake drum supporting device according to claim 1, wherein the case is made of an aluminum alloy and the stationary support portion is made of steel separately of the case and attached to the case.

3. The band brake drum supporting device according to claim 1, wherein stationary support portion supports an output gear through a bearing at the circumferential side of the boss portion facing the case.

4. The band brake drum supporting device according to claim 2, wherein stationary support portion supports an gear through a bearing at the outer circumferential side of the boss portion facing the case.

* * * * *